UNITED STATES PATENT OFFICE.

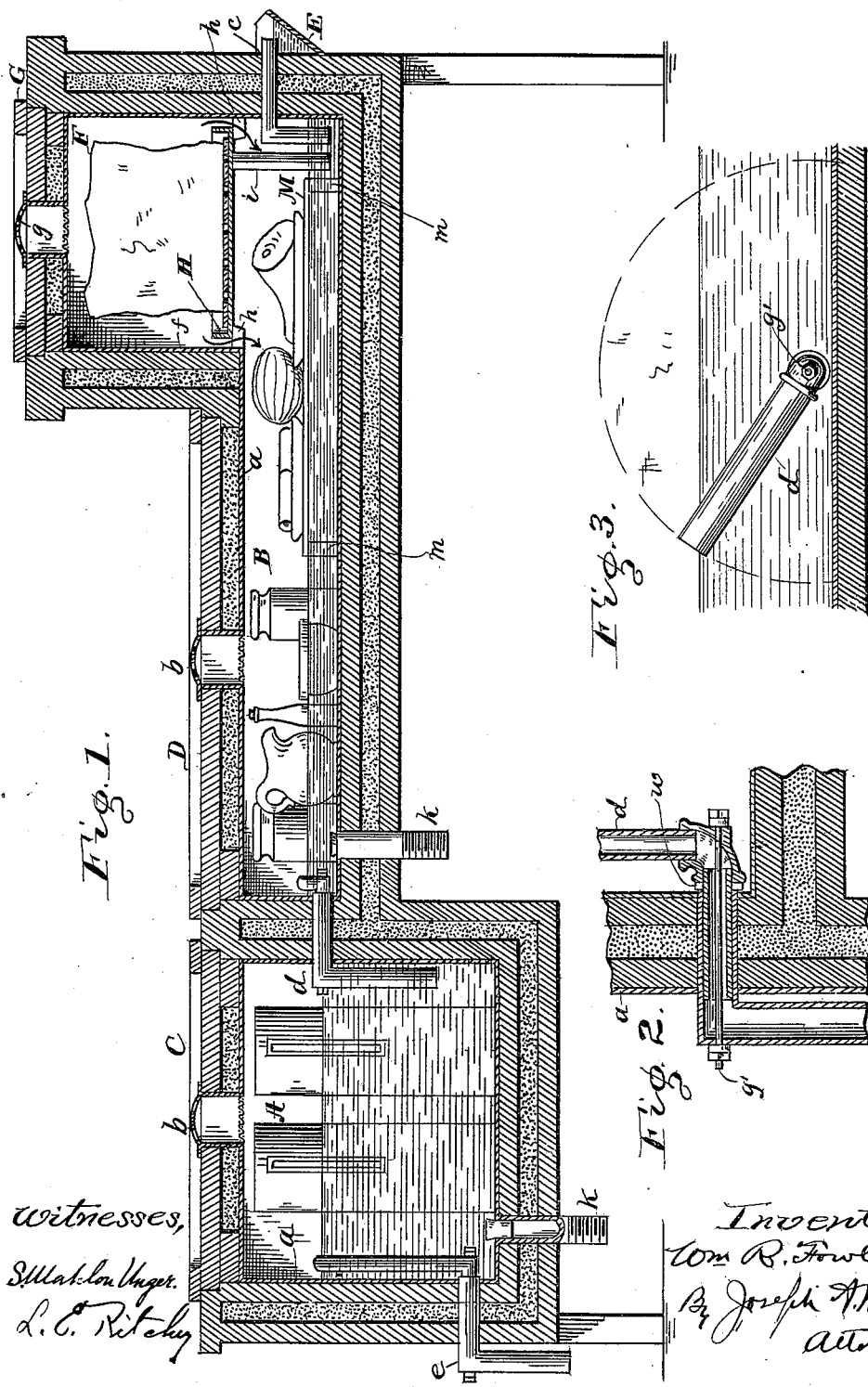

WILLIAM R. FOWLER, OF LAFAYETTE, INDIANA, ASSIGNOR TO THE POLAR CREAMERY COMPANY, OF SAME PLACE.

REFRIGERATOR OR CREAMERY.

SPECIFICATION forming part of Letters Patent No. 659,020, dated October 2, 1900.

Application filed July 16, 1900. Serial No. 23,818. (No model.)

*To all whom it may concern:*

Be it known that I, WILLIAM R. FOWLER, a citizen of the United States, residing at Lafayette, in the county of Tippecanoe and State of Indiana, have invented certain new and useful Improvements in Refrigerators or Creameries, of which the following is a specification.

The object of this invention is to provide a refrigerator for the keeping of edibles of all kinds at about the temperature of cold well-water and for cooling and keeping milk during the cream-forming period at a correspondingly-low temperature, but in a compartment so separated from the one containing edibles as to prevent air passage and tainting of the milk from said edibles.

The object is to provide outside vents by which animal or artificial heat contained in the commodities when placed in the refrigerator may escape to the outside and through which by the separation of the water contained in the refrigerator the temperature of the water remaining will be lowered.

The object also in case water of the required low temperature cannot be obtained is to provide means by the use of any suitable cooling agent, as ice, liquid air, or the like, for reducing the temperature of the water to as low a degree as is required.

The object when ice is used is to keep it in a dry state and to provide a receptacle which when ice is not required can be used for holding bread, cakes, pies, and other articles of food, which while being kept out of the water will be maintained in a moist condition by the air which is rendered humid by the presence of the water below.

The invention will comprise two compartments; and a further object of the invention is to provide a communication between them with an adjustment whereby the water discharging from one compartment through said communication into the other can be maintained by means of said adjustment at different heights.

This invention is an improvement in milk-coolers patented to me January 26, 1886, No. 334,767, and July 20, 1886, No. 345,776.

I accomplish the objects of the invention by the mechanism illustrated in the accompanying drawings, in which—

Figure 1 is a longitudinal vertical section of my invention; Fig. 2, a detail in longitudinal section of the discharge-pipe, and Fig. 3 a detail showing the discharge-pipe in front view.

Referring to the accompanying drawings, A B represent, respectively, the deep and shallow tanks, which are preferably lined with sheet metal, as shown at $a$, and are each provided with a cover C D, having suitable ventilators $b$ for carrying off the impurities and animal and artificial heat arising from the milk or food placed in the refrigerator in vessels suitaby supported above the water in said refrigerator. The tanks above described are formed with double walls having a filling of charcoal or other suitable non-conductor of heat, as also are the covers to said tanks. The tank B at its outer end is provided with a pipe $c$ for supplying water thereto, and a bucket E is connected to the end of the tank which surrounds the projecting end of the pipe and extends above it, whereby the necessity of making a connection to the pipe when filling the tanks is avoided. The tanks A B communicate with each other through a pipe $d$ at the end of the tank A. The pipes $d$ and $e$ are in two parts, both parts being preferably L-shaped, the inverted horizontal member of one making a water-tight fit in a communicating opening through the wall and the horizontal member of the other being introduced into the first and making a water-tight fit therein, a packing or washer $w$ being introduced in the manner as shown in Fig. 2 and the abutting parts being forced against it by the draw-bolt $g$. A swivel-joint is thus obtained, which permits the upper member of the pipe to be shifted in the manner as shown in dotted line in Fig. 3, which changes the altitude of the inlet of the discharge-pipe and permits the height of water in the respective tanks to be changed. Thus the tank B may be completely drained into tank A, or it can be completely filled or kept at any intermediate point by setting the inlet of the pipe $d$ at the desired point. The tank A can be drained by setting the inlet of pipe $e$ in like manner. This enables deep or shallow vessels to be set in the water by regulating the depth of water to suit.

F is the ice-chamber, which, like the tanks A B, is formed with double walls containing a heat-non-conducting filling and has a sheet-metal lining $f$ and a cover G, with ventilator $g$. The ice-chamber F extends some distance above the tank B and forms an extension thereto and has blocks or brackets $h$ connected to its opposite side walls to support a shelf H, upon which the ice is placed. This shelf is preferably simply a sheet-metal pan resting on a suitable framework of slats to strengthen and support it and having wooden slats inside to prevent injury. The pan and slats are easily removed for cleansing or other purposes, and the pan has connected to it a drip-tube $i$, which is of sufficient length to extend down below the water-level in the tank B, as shown, to prevent any drippings from the ice entering the pans or plates or falling on the edibles should any be placed below. The purpose of the ice-chamber is to cool the water in the shallow tank as it passes therefrom to the deep tank when the water from the pump or spring is not sufficiently cold to reduce the milk to the required temperature. The cold air produced by the ice does not pass from the shallow to the deeper tank, but remains in the former-mentioned tank for the express purpose of reducing the temperature much lower. The shallow tank becomes the refrigerator in which cream skimmed off of the milk placed in the other tank is kept until needed for churning or other use, and in which edibles usually kept in refrigerators are also placed, the temperature required in this refrigerator part being much lower than that needed for the milk.

M is a slatted platform supported on legs $m$, so as to stand above the water in the tank. It is removable and can be changed in its position in the tank. It is designed to receive shallow plates and dishes and perhaps edibles placed loosely thereon to keep them out of the water.

To drain the tanks, the pipes $k$ are provided, having plugs or cocks and preferably threaded at their lower ends to receive pipes for conveying the waste water to a drain or water-trough and permitting each compartment to be emptied separately and independently of the other, the one not changing the temperature of the other. The water inlets and outlets are closed and sealed by the tubes being trapped—that is, by their being bent down and terminated under the surface of the water. Consequently there is no supply of air from the outside through said water inlets and outlets, and the ventilators are made to be opened and closed at will. There is an air-space above the water, and whenever the ventilators are opened a certain amount of evaporation of the water occurs, which evaporation lowers the temperature of the water and the cold water acts with greater efficiency than air would do to equalize the temperature and maintain frigorific conditions.

Having now fully described my invention, what I claim as new, and wish to secure by Letters Patent, is—

1. In a milk-cooler and refrigerator, one deep and one shallow tank communicating with each other through a pipe having a rocking portion with a lateral extension from said rocking portion forming an adjustable inlet, and provided, respectively, at their outer ends with a discharge-pipe and a supply-pipe, the several pipes having elbows to act as traps, the shallow tank having an ice-chamber arranged above it, provided with a shelf or pan for the ice, and a drip-tube connected thereto and extending down below the water-level in said tank, substantially as and for the purposes set forth.

2. In a refrigerator and creamery, one deep and one shallow tank communicating with each other through a pipe having an arm with swinging adjustment in a vertical plane, and provided, respectively, at their outer ends with a discharge-pipe and a supply-pipe, the several pipes having elbows to act as traps and the outlet-pipe having an adjustable inlet as described, the said shallow tank having an ice-chamber extension arranged above it provided with a pan for the ice, said pan having a drip-tube, substantially as and for the purposes set forth.

In witness whereof I have hereunto set my hand and seal at Lafayette, Indiana, this 13th day of July, A. D. 1900.

WILLIAM R. FOWLER. [L. S.]

Witnesses:
 H. N. THROCKMORTON,
 O. W. CAMPBELL.